United States Patent
Schorn et al.

(10) Patent No.: US 10,203,008 B2
(45) Date of Patent: Feb. 12, 2019

(54) DISC FOR A DISC BRAKE

(71) Applicant: Freni Brembo S.p.A., Curno (IT)

(72) Inventors: Michael Schorn, Camparada (IT);
Giovanni Mario Tironi, Dalmine (IT);
Simone Biondo, Limbiate (IT)

(73) Assignee: Freni Brembo S.p.A., Curno (Bergamo) (IT)

( * ) Notice: Subject to any disclaimer, the term of this patent is extended or adjusted under 35 U.S.C. 154(b) by 0 days.

(21) Appl. No.: 13/958,691

(22) Filed: Aug. 5, 2013

(65) Prior Publication Data

US 2014/0158486 A1 Jun. 12, 2014

Related U.S. Application Data

(63) Continuation-in-part of application No. 11/577,289, filed as application No. PCT/IT2004/000590 on Oct. 26, 2004, now abandoned.

(51) Int. Cl.
*F16D 65/12* (2006.01)
*F16D 65/02* (2006.01)
*F16D 69/00* (2006.01)

(52) U.S. Cl.
CPC ........ *F16D 65/12* (2013.01); *F16D 2065/136* (2013.01); *F16D 2065/1316* (2013.01); *F16D 2065/1328* (2013.01); *F16D 2065/1344* (2013.01); *F16D 2065/1356* (2013.01); *F16D 2069/004* (2013.01); *F16D 2200/003* (2013.01); *F16D 2200/0013* (2013.01); *F16D 2250/00* (2013.01); *F16D 2250/0015* (2013.01); *F16D 2250/0092* (2013.01)

(58) Field of Classification Search
CPC .................. F16D 2065/1316; F16D 2065/136
USPC ....... 188/218 XL, 264 A, 264 AA, 17, 18 R, 188/18 A, 71.6
See application file for complete search history.

(56) References Cited

U.S. PATENT DOCUMENTS

| | | |
|---|---|---|
| 2,412,432 A | 4/1945 | Tack |
| 3,820,588 A | 6/1974 | Funke |
| 5,109,960 A | 5/1992 | Guenther et al. |
| 5,823,303 A | 10/1998 | Schwarz |
| 6,073,735 A | 6/2000 | Botsch et al. |
| 6,152,270 A | 11/2000 | Giorgetti |
| 6,564,912 B1 | 5/2003 | Koschinat |
| 2002/0104721 A1 | 8/2002 | Schaus et al. |

(Continued)

FOREIGN PATENT DOCUMENTS

| | | |
|---|---|---|
| DE | 4003732 | 8/1991 |
| EP | 0851140 | 7/1998 |

(Continued)

*Primary Examiner* — Xuan Lan Nguyen
(74) *Attorney, Agent, or Firm* — Davis & Bujold PLLC; Michael J. Bujold

(57) ABSTRACT

A disc brake rotor has a support hub and coaxial braking band. The support hub has a plurality of radial seats and the braking band has a plurality of connecting elements which transfer torque between the band and the hub. The connecting elements are integral and made as one piece with the braking band and extend from the braking band in order to engage the corresponding radial seats. The connecting elements are surrounded by walls which are integral and made as one piece with the support hub such as to be fastened in the axial direction and in the tangential direction, but capable of sliding in the radial direction.

15 Claims, 10 Drawing Sheets

(56) References Cited

U.S. PATENT DOCUMENTS

2003/0159893 A1   8/2003   Tironi
2004/0040803 A1   3/2004   Debus et al.

FOREIGN PATENT DOCUMENTS

EP   1092889         4/2003
FR   2698425 A1  *  5/1994   ............. F16D 65/12

* cited by examiner

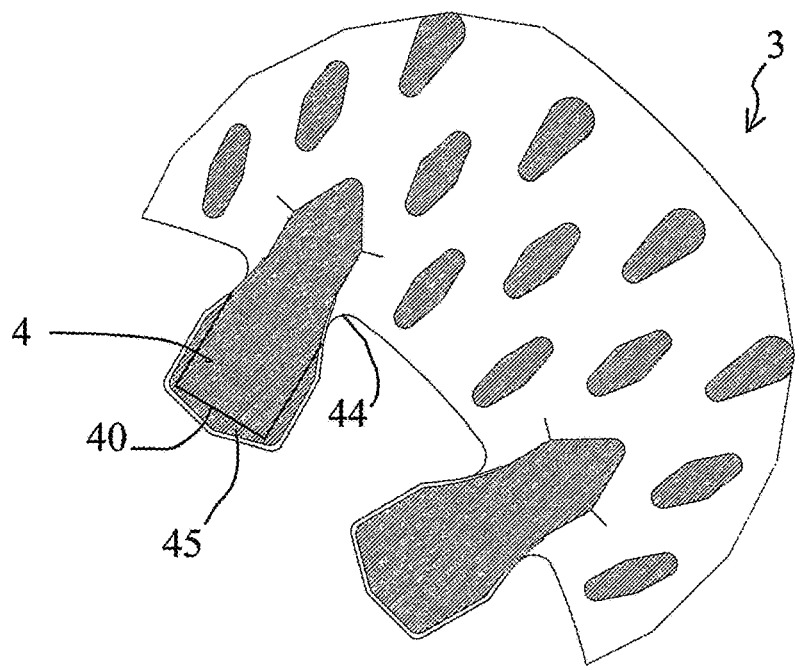
Fig. 8.a
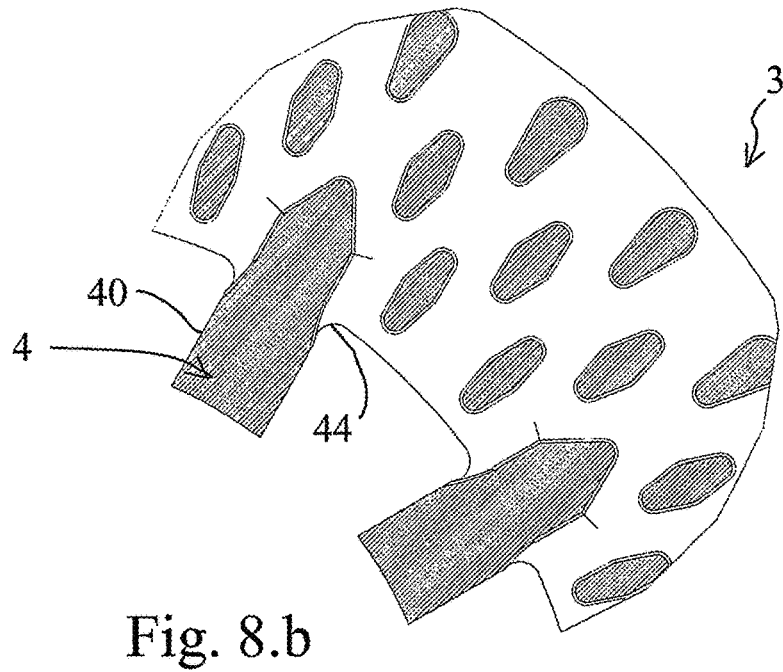
Fig. 8.b

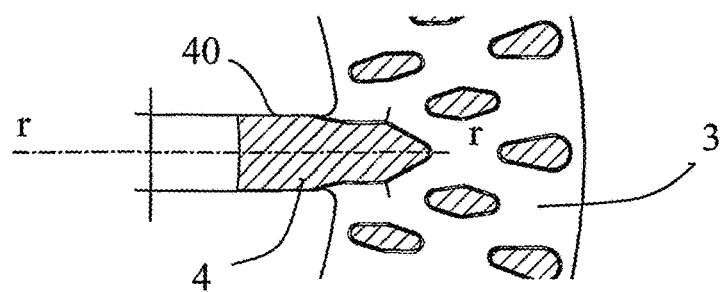
Fig. 9.a
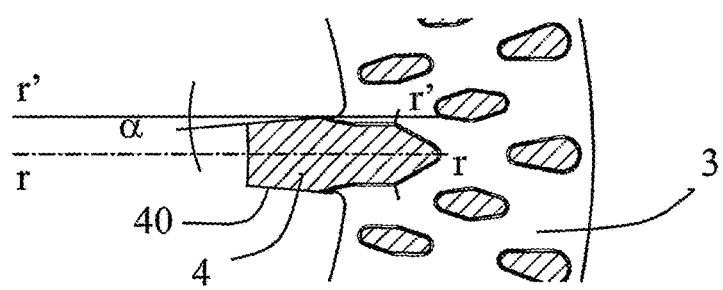
Fig. 9.b
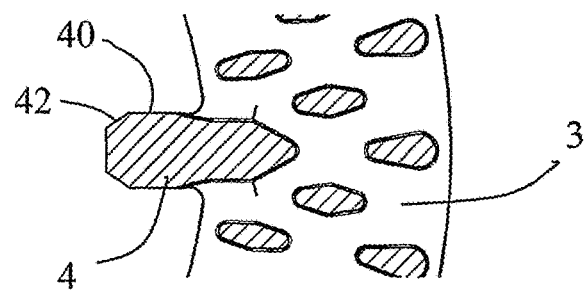
Fig. 9.c

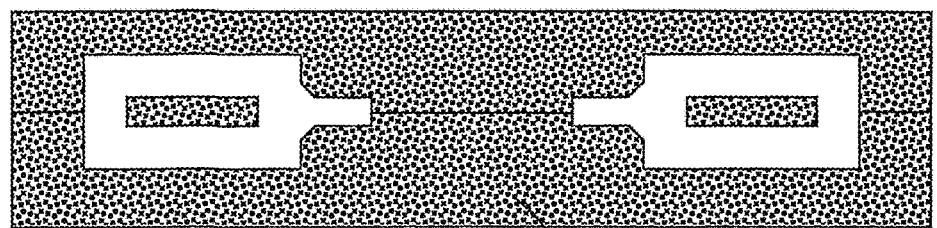
Fig. 11.a
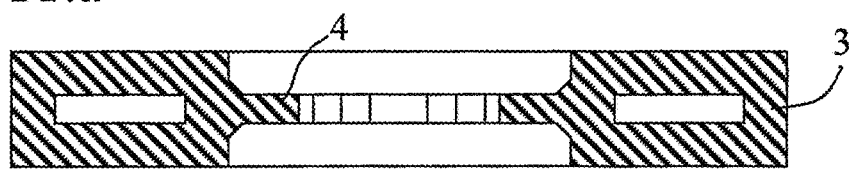
Fig. 11.b
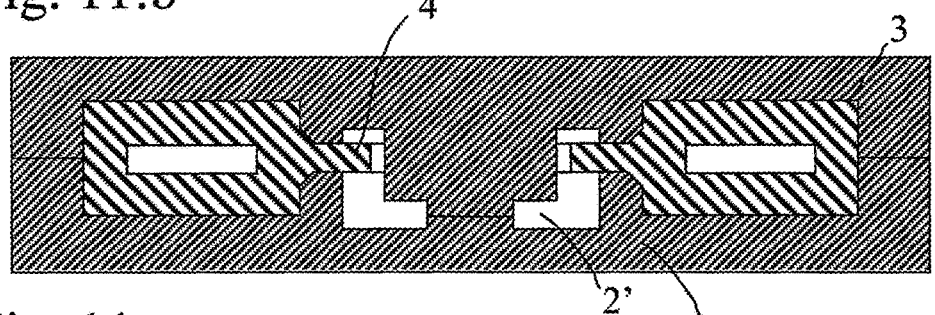
Fig. 11.c
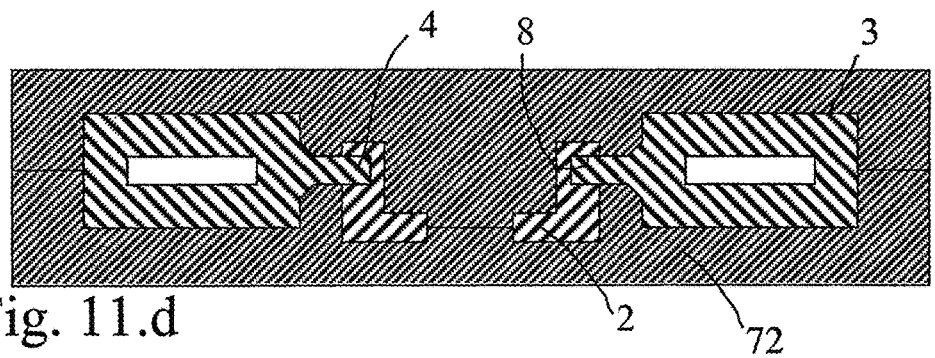
Fig. 11.d
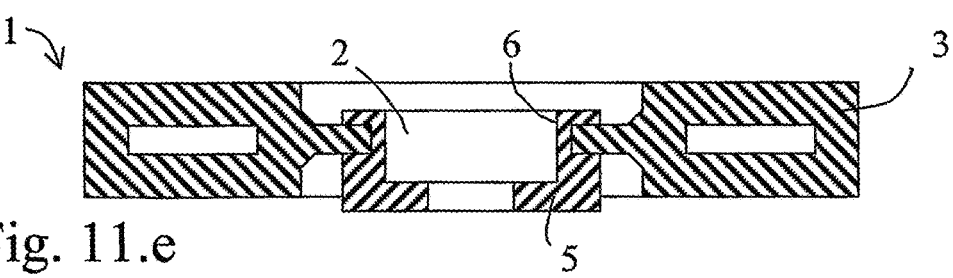
Fig. 11.e

DISC FOR A DISC BRAKE

This application is a continuation-in-part of copending application Ser. No. 11/577,289, filed Jun. 4, 2007, which was the U.S. national phase of international application PCT/IT2004/000590 filed Oct. 26, 2004.

BACKGROUND OF THE INVENTION

The present invention relates to a rotor for a disc brake, particularly though not exclusively, for applications in the car field.

It is known that the rotors of the above-mentioned type consist of two parts sharing a rotation axis. A first part, the support hub, is destined to be connected to the wheel hub of a vehicle, whereas the remaining peripheral part, the braking band, is destined to cooperate with the disk brake calipers to carry out the braking action on the vehicle. The braking band can be either solid or, such as in the examples represented in the annexed figures, ventilated. The ventilated band comprises two binders being connected by a plurality of bridges, such as to define cooling air ducts.

With reference to the rotor and the rotation axis thereof, any direction parallel to said axis is defined as being axial, any perpendicular direction to the axis and incident thereto is defined as being radial, and any direction tangential to a circumference centered on said axis and laying on a normal plane to said axis is defined as being tangential.

It is also known that, when the brake is being operated, friction between the brake caliper pads and the braking band surface generates a considerable amount of heat must be released. The generated heat causes a number of unwanted phenomena, including overheating of the components and the consequent thermal expansion and distortion of the same.

In the disc brake field, the need is particularly felt to make the braking band of a material which, besides ensuring the desired friction characteristics, is capable of maintaining its mechanical characteristics as unchanged as possible upon increase in the operating temperature. In view of the above, it is particularly convenient to manufacture the braking band of cast iron.

Likewise, the need is particularly felt of manufacturing the support hub of a material that is as light as possible, to reduce the mass of the rotor and consequently the non-suspended masses of the vehicle. In view of the above, it is particularly convenient to manufacture the support hub of a light alloy, such as aluminium alloy.

With reference to the prior art rotors, it should be noted that the distortions caused by heat strain entail inconveniences in the operation of the disc brake, especially uneven wear of the brake caliper pads. This is mainly due to the fact that, contrary to the braking band, which tends to radially deform while remaining coplanar with itself, the support hub is deformed by taking the shape of a cone that also defines the twist of the braking band. The deformation of the support hub substantially defines the twist and accordingly the loss of coplanarity of the braking band.

From what has been stated above, there emerges a double need of maintaining unchanged the transmission of the braking torque from the braking band to the support hub and, at the same time, allowing the braking band to dilate radially, due to the heat stress to which it is subjected as much independently from the support hub as possible.

The patent EP1092889, in the name of the same applicant, describes a rotor in which the hub of aluminium alloy and the braking band of cast iron are joined by a plurality of stainless steel pins. The pins, which are interference coupled in the braking band and slackly in the hub, make it possible for the band to radially dilate. This solution is particularly expensive and complicated from the point of view of construction. Furthermore, the small section of the steel pins induces high stress peaks in the material in the step of transmission of the braking torque from the band to the hub.

It is also known from U.S. Pat. No. 6,152,270, in the name of the same applicant, a rotor having a braking band of cast iron and a support hub made of a light alloy. Both pieces are produced by subsequent castings in such a way as to be intimately adhered, so that they are integral to each other. This solution, though being cost-effective and easy to implement, does not allow the band to radially dilate independently from the hub.

SUMMARY OF THE INVENTION

The problem at the heart of the present invention is to provide a rotor for a disc brake that has such structural and functional characteristics to meet the above-mentioned requirement and, at the same time, to overcome the drawbacks cited with reference to the prior art.

This problem is resolved by a rotor for disc brake as described below.

BRIEF DESCRIPTION OF THE DRAWINGS

Further characteristics and the advantages of the rotor for a disc brake according to the invention will become apparent from the description of a preferred embodiment thereof, which is merely illustrative and non-limiting, with reference to the annexed figures, wherein:

FIGS. 8.a and 8.b show a detail of a braking band according to the invention in two steps of the manufacturing process;

FIGS. 9.a, 9.b and 9.c show three different embodiments of a detail of a braking band according to the invention;

FIGS. 11.a to 11.e are subsequent steps of the method for manufacturing the rotor according to the invention.

DESCRIPTION OF THE PREFERRED EMBODIMENTS

Figure 1:
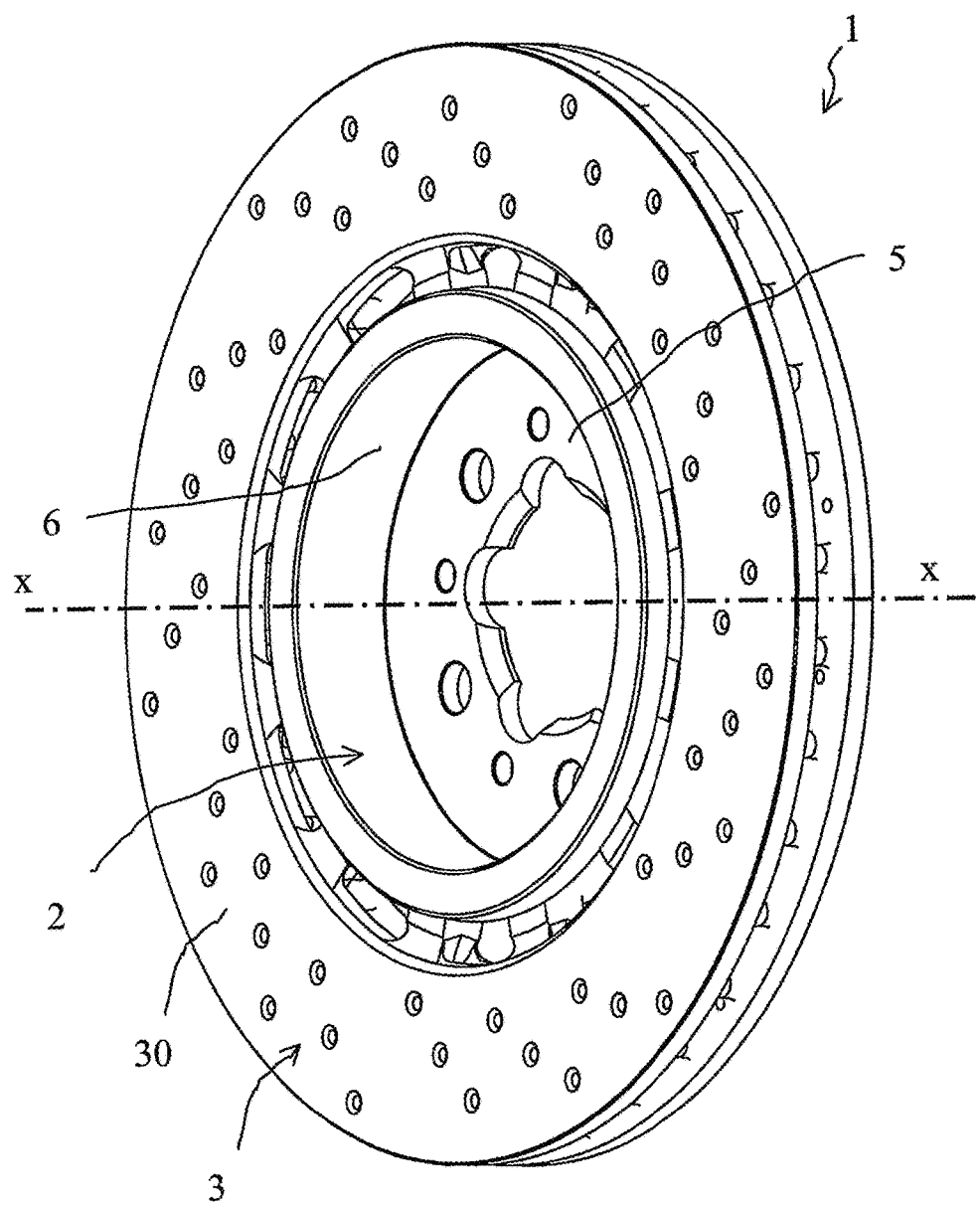
FIG. 1 shows a rotor for a disc brake according to the invention in a perspective view.
Figure 2:
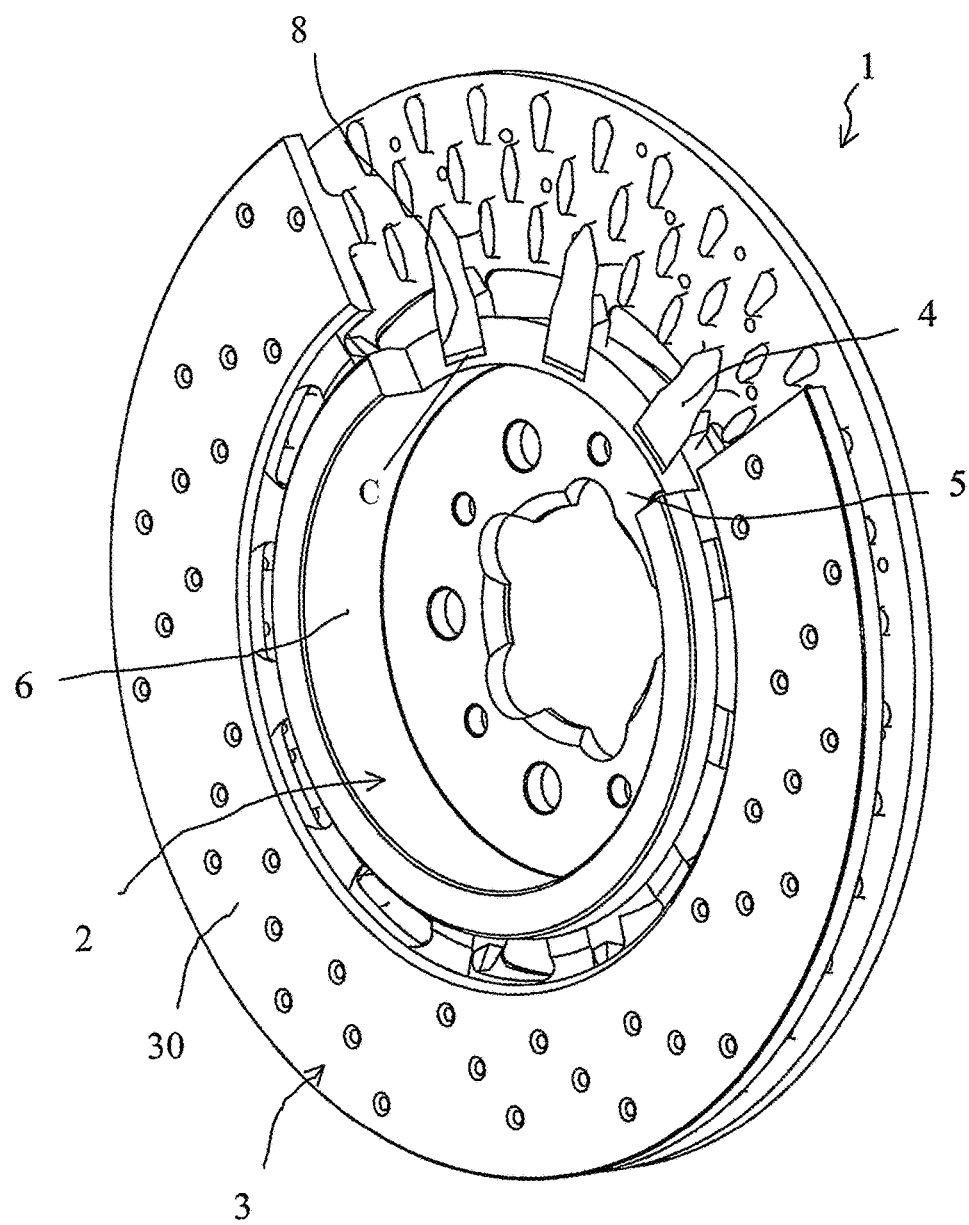
FIG. 2 shows the rotor from FIG. 1 in a partially sectional perspective view.
Figure 3:
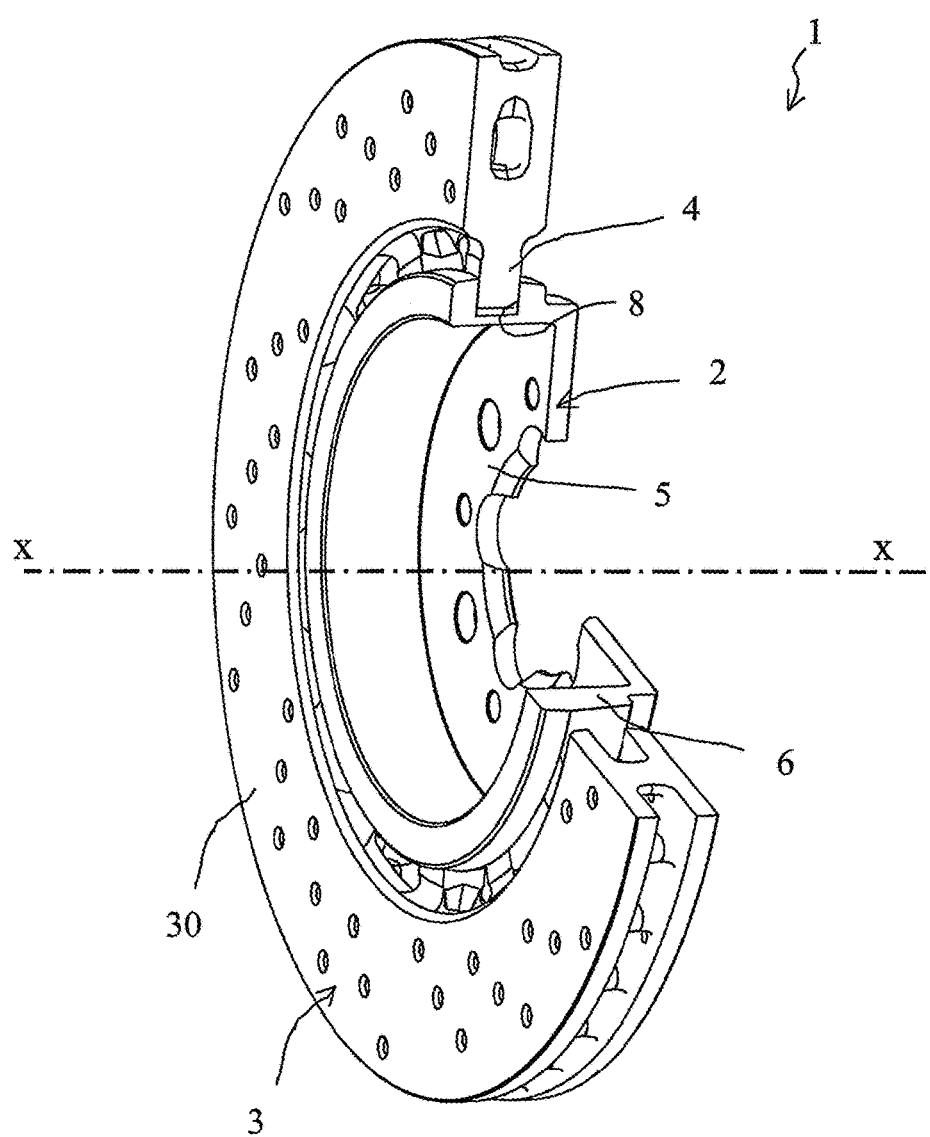
FIG. 3 shows the rotor from FIG. 1 in a partially sectional perspective view.
Figure 4:
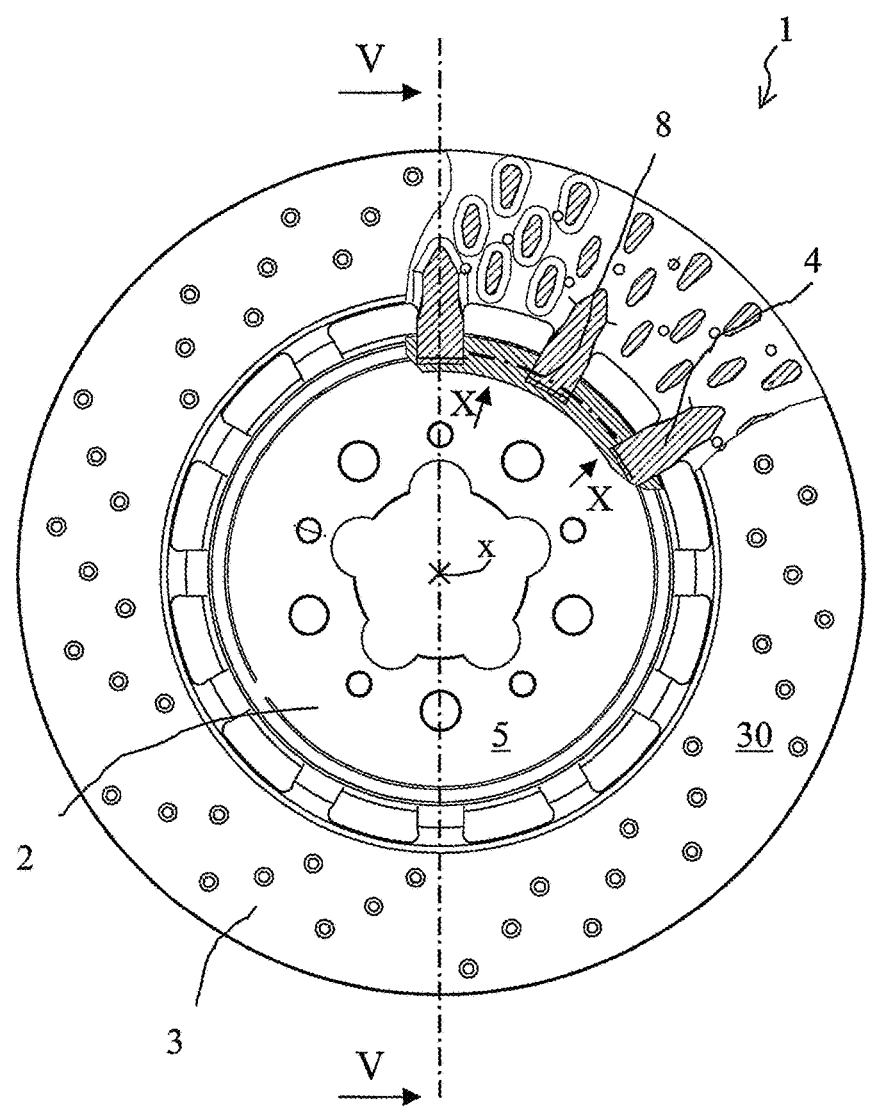
FIG. 4 shows the rotor from FIG. 1 in a partially sectional front view.
Figure 5:
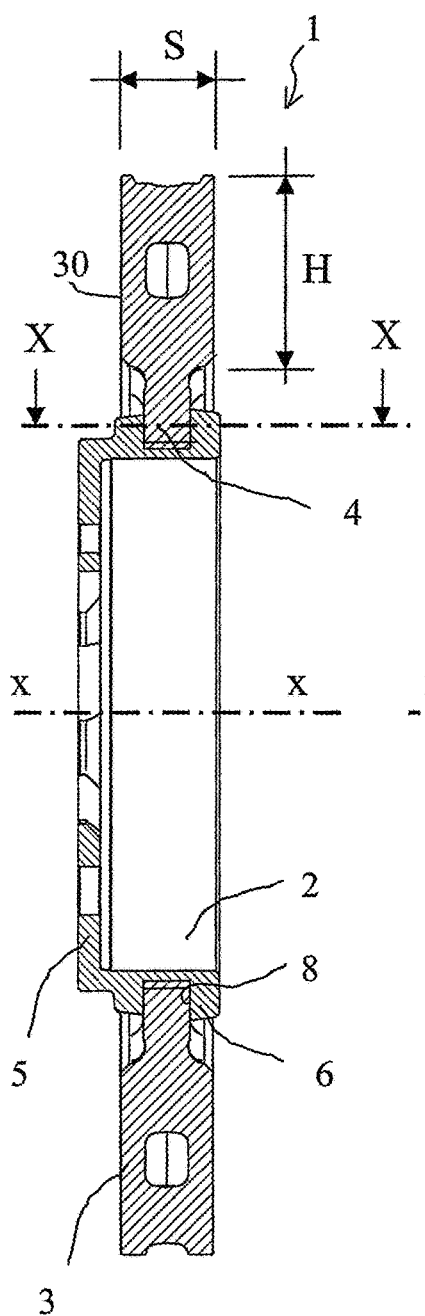
FIG. 5 shows a section taken along the line V-V of FIG. 4.

With reference to the above mentioned figures, reference numeral 1 generally indicates a rotor according to the invention that is destined to be used in a disc brake (not shown) of a vehicle, for example a car.

Figure 6:
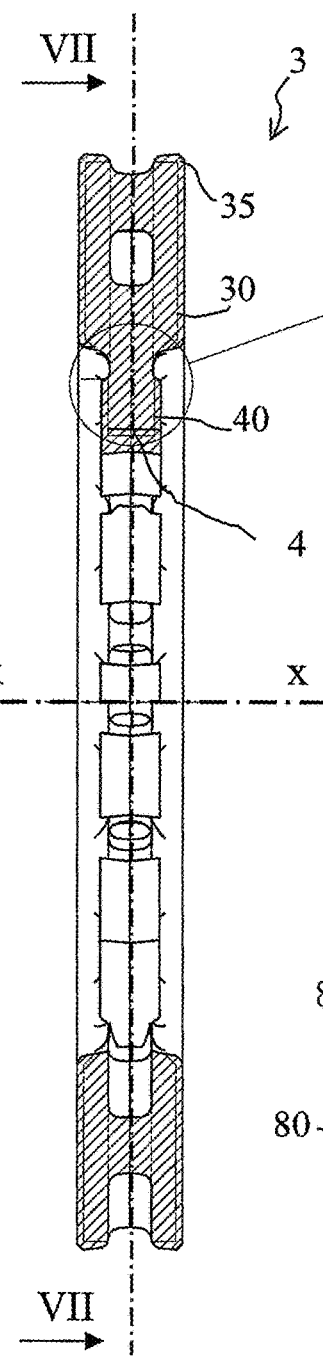
FIG. 6 shows a braking band according to the invention taken along the line VI-VI of FIG. 7.
Figure 6A:
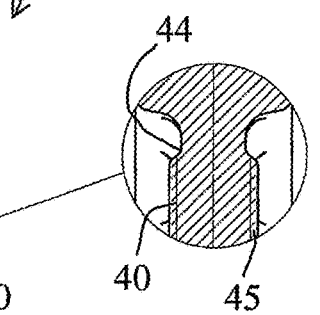
FIG. 6a shows a detail from FIG. 6.
Figure 10:
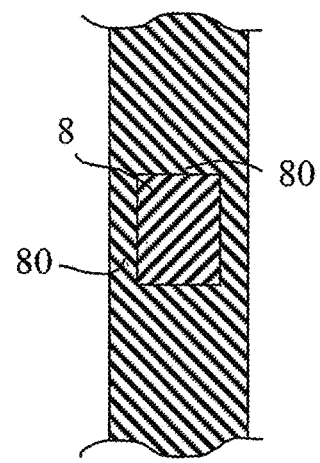
FIG. 10 shows a section taken along the line X-X of FIGS. 4 and 5.
Figure 7:
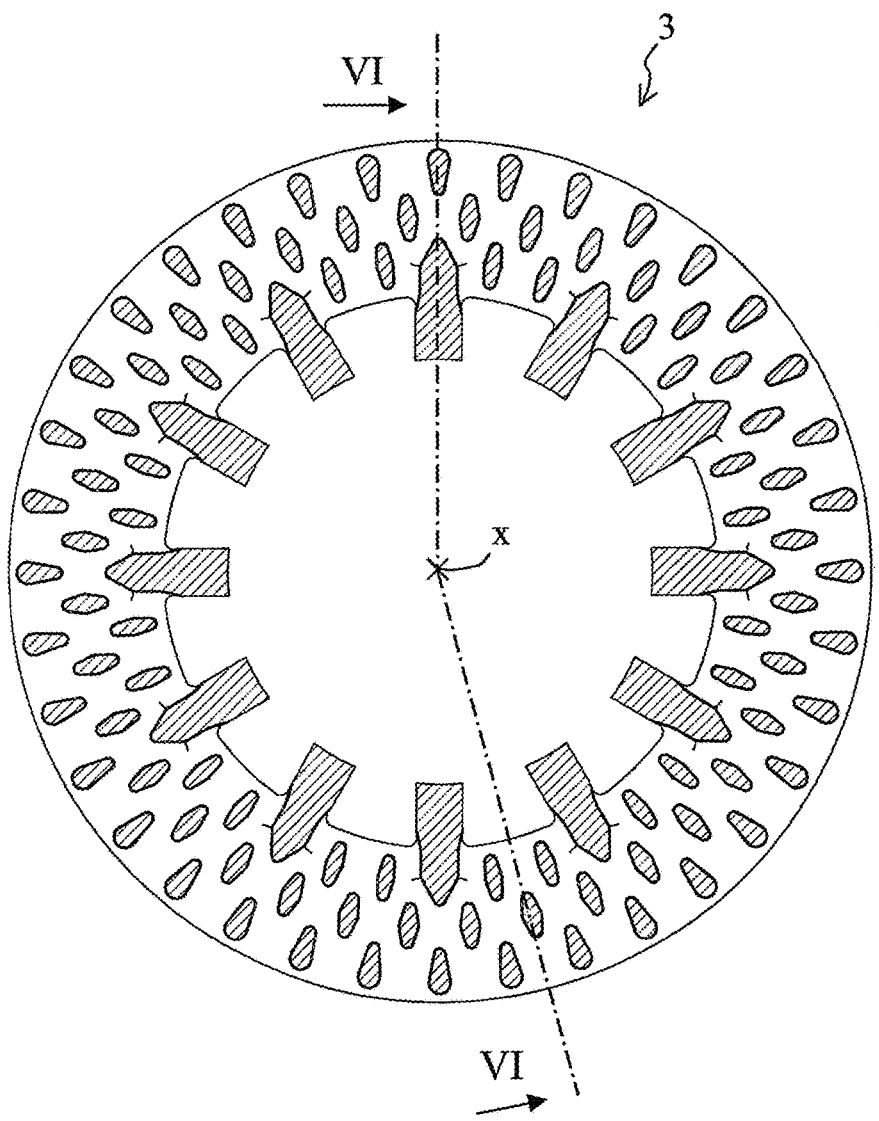
FIG. 7 shows a braking band according to the invention taken along the line VII-VII of FIG. 6.
Figure 12:
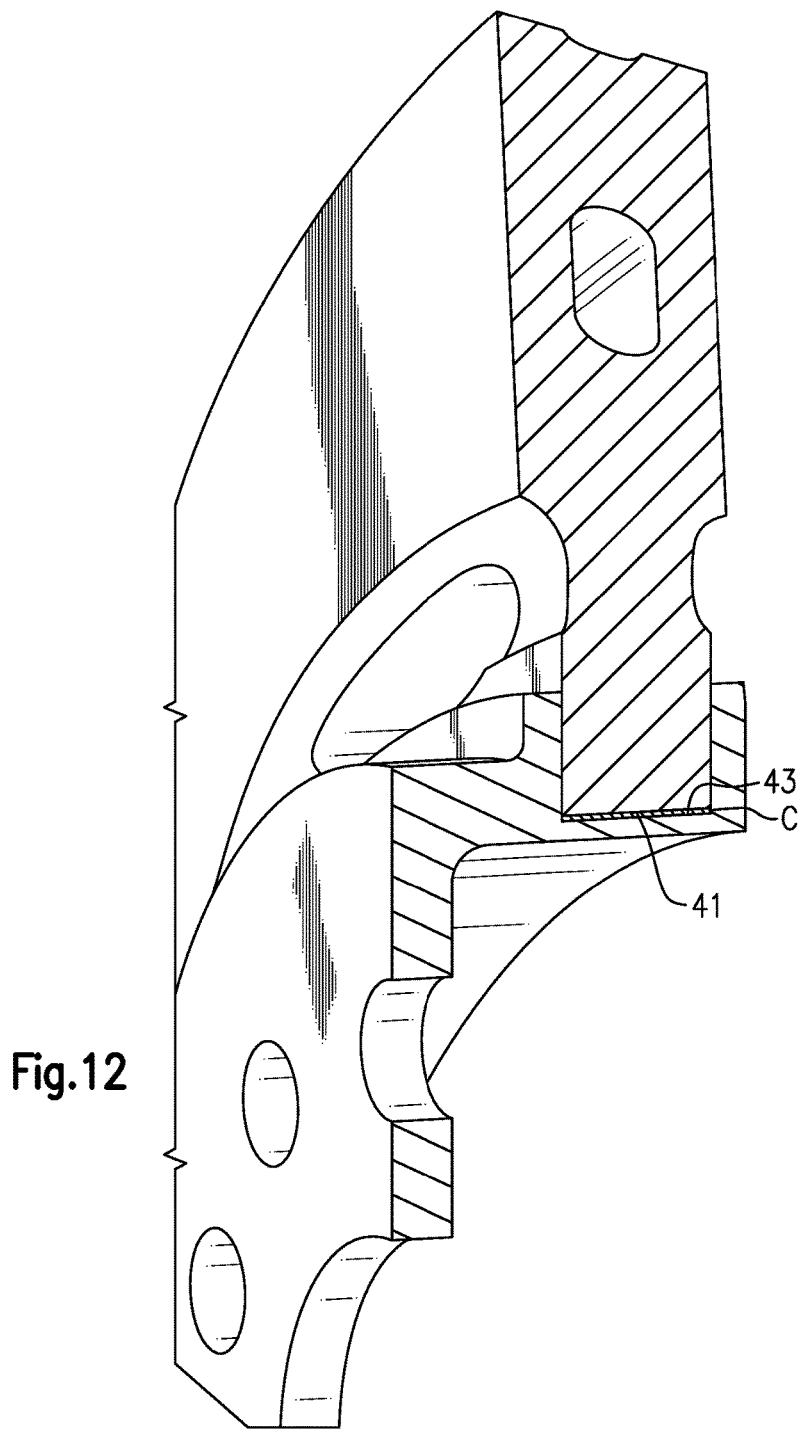
FIG. 12 is a perspective view of the rotor with a portion thereof cut away, to show internal structure.

The rotor 1 has a substantially circular shape that develops around a symmetry axis being indicated with x-x and can be defined a middle plane, the outline thereof being indicated with a dotted line in FIG. 6.

The rotor 1 comprises a support hub 2 and a braking band 3 that is coaxial with the support hub 2, being provided with a plurality of radially projecting connecting elements 4 suitable to connect the braking band 3 to the support hub 2.

The support hub 2 comprises a central portion 5 destined to be connected, in a conventional manner, to the wheel hub of a vehicle and a peripheral annular portion 6 which is cantilevered from the central portion 5, for example in a direction substantially parallel to x-x axis.

The braking band 3 is an annular disc of a preset thickness S and height H, which is coaxially supported by the peripheral annular portion 6 of the support hub 2. The braking band 3 is destined to cooperate with the disc brake caliper to exert the braking action on the vehicle.

With particular reference to FIGS. 8.b and 9.a, each of the connecting elements 4 is for example a prismatic projection having a quadrangular section, which is suitable to radially connect the braking band 3 to the support hub 2. FIG. 9.a shows how both side faces 40 of the prismatic projection are parallel to the r-r radial axis passing through the center of the projection 4.

Alternatively, projections having different shapes can be also used.

With particular reference to FIG. 9.b, for example, the side faces 40 of the projection 4 are not parallel to each other. Each of them defines an angle α with the direction r'-r' parallel to the radial axis r-r passing through the center of the projection. The angle α can vary, according to the particular design requirements, from 0° to 3°. Consequently, the angle 2α defined between two opposite faces 40 can vary from 0° and 6.

With particular reference to FIG. 9.c, again, the projection 4 has side faces 40 being parallel for the first length thereof being contiguous to the root and convergent in the second end length where a chamfer 42 is formed. In other words, the projection of FIG. 9.c is similar to that of FIG. 9.a, to which the sharp edges at the ends radially near to axis x-x have been chamfered.

The configuration of FIG. 9.c with the chamfered sharp edges, besides from a geometry like that of FIG. 9.a with parallel side faces 40, can also be adopted from a geometry like that in FIG. 9.b with slightly inclined faces.

Independently of the geometry selected, the side faces 40 of the single projection 4 are arranged such as to limit their surface roughness within preset values. Preferably, the side faces 40 of the projections have an average surface roughness $R_a$ less than $6.4 \times 10^{-6}$ meters.

The connecting elements 4, i.e. the projections, are made as one piece with the braking band 3 such as to be integral therewith.

As can be seen in the annexed drawings, the projections 4 are joined to the body of the braking band 3 by means of fillets 44. More particularly, the detail of the band section from FIG. 6.a and the detail of the section in the middle plane of FIGS. 8.a and 8.b should be seen. Upon defining the particular union radius during the design step, one should take into account the type of material employed for manufacturing the braking band 3 in a known manner.

The projections 4 are seated in corresponding radial seats 8 formed in the peripheral annular portion 6 of the support hub 2. These radial seats are 8 defined by walls 80 made as one piece with the hub body 2, such as to be integral therewith.

The radial seats 8, being provided by means of a method that will be described herein below, are perfectly complementary to the side faces 40 of the respective projections 4 or at least some lengths thereof.

In other words, the radial seats 8 at least partially surround the projections 4 such as to restrain the movements thereof in the axial and tangential directions.

As shown in FIGS. 2-6 and 12, there is a clearance "C" between the free end 41 of each projection (the inner radial end of the projection) and the bottom 43 of the respective seat formed in the hub (a radial bottom surface of the seat formed by the seat). The clearance at room temperature, in the range of about 0.2 to 3 mm, is sufficiently great that no matter what the difference in working temperature of the disc and the hub, there is always a positive clearance between the parts. This prevents the projections from bottoming in their seats. Thus, despite the high temperatures reached by the braking band 3, the disc is not subjected to any deformation other than thermal expansion in its plane. In fact, due to the fact that each projection 4 can slide radially within its seat 8, the braking band 3 is free to expand or dilate in its plane independently of the support hub 2.

The coupling between the projection 4 and the seat 8 is not an interference coupling; on the contrary it provides a backlash, i.e., play, even though very small.

The surfaces of the side faces 40 and the walls 80 are intimately coupled to each other without any adhesion to each other. In other words, the surfaces of the side faces 40 and the walls 80 are intimately coupled yet disjointed, i.e., with 'play' or 'clearance fit'.

In view of the above, it will appreciated by those skilled in the art that both the walls 80 and the side faces 40 are made such that, while movements in the axial and tangential directions are prevented because the side faces 40 rest on walls 80, the radial movement of the single projection 4 within the single seat 8 is not prevented by anything.

Particularly, radial movement is not prevented either by macroscopic fittings or micro-telescoping of both materials composing the projection 4 and the walls 80 of seat 8. These micro-telescoping may occur with greater surface roughness of the surfaces.

With particular reference to FIG. 11, the above method for manufacturing the disc according to the invention, provides first of all that the braking band 3 be manufactured of a suitable material, for example cast iron.

Advantageously, in a manner known per se, the braking band 3 is provided by casting, for example in a sand mould 70. In this manufacturing step of the band, the connecting elements 4 are also manufactured, for example the protrusions 4 described above.

It is particularly advantageous, in this casting step, to provide a stock 35, 45 both on the braking band 3 itself and the side faces 40 of the projections 4. In FIG. 6 there is outlined how the surface 30 of the braking band 3 will be after the stock 35 has been removed; in FIG. 6, in the detail of FIG. 6.a and in FIG. 8.a there is outlined how the side face 40 of the projection 4 will be after the stock 45 has been removed.

The stock being provided upon the casting step has to be removed in order to bring the braking band to the desired thickness S, and at the same time, to bring the projections 4 to the desired size.

This step of removing the stock can be brought to completion in a manner known per se by means of tool machining. FIGS. 8.a and 8.b show two projections 4 at the end of the casting step and at the end of the step of removing the stock 45, respectively.

In accordance with an embodiment, in this step there is also defined the geometry of protrusions 4. In particular, as described above, one may make the faces 40 parallel, or one may provide that they are inclined relative to each other according to a small angle, preferably comprised 0° and 6°.

Simultaneously and independently from the selection on the parallelism of the faces 40, one may also decide whether to provide a chamfer 42 or let the faces 40 end with a sharp edge.

In accordance with an embodiment of the method, during this working step, the desired surface roughness is conferred to the faces of the projections. Particularly, the surface roughness $R_a$ will be preferably less than $6.4 \times 10^{-6}$ meters.

In accordance with another embodiment of the method, during the manufacturing step of the braking band, any stock 45 cannot be provided on the projections 4 of the braking band 3, such that the desired geometry is already conferred thereto. For example, the braking band can be made by means of chill casting instead of sand. It is thus possible to obtain an improved control on the shape of the piece being manufactured by casting. In accordance with this method, due to a manufacturing step of the braking band 3 allowing one to control the geometry, the surface finishing step may even be superfluous. In fact, the projections 4 being manufactured for example by chill casting may already have a suitable surface roughness, without requiring further working to avoid micro-telescoping.

Once that the braking band 3 and the projections 4 have reached the desired size and surface roughness, the method for manufacturing the disc according to the invention provides that the braking band is placed in a mould 72 for casting the support hub 2. The mould 72, which is schematically represented in FIG. 11.*c*, houses the braking band 3 such as to cause the projections 4 to extend towards the inside of cavity 2', which is complementary to the shape of the hub 2.

Thereafter, the molten metal destined to form the hub 2, preferably a light alloy, for example an aluminium alloy is cast in the cavity 2'.

In this way, in the support hub 2, a seat 8 is manufactured for each projection 4. The surfaces of the side faces 40 and the walls 80 thus made are intimately coupled to each other without any adhesion occurring to each other.

Both the walls 80 and the side faces 40 are manufactured such as to allow the radial movement of the single projection 4 within the single seat 8, whereas the movement in the axial and tangential directions are prevented because the side faces 40 rest on the walls 80.

Particularly, radial movement is not prevented either by macroscopic fittings or micro-telescoping of both materials composing the projection 4 and walls 80 of the seat 8. This micro-telescoping may occur with greater surface roughness of the surfaces.

In accordance with an embodiment of the method, before carrying out the cast of the support hub 2, when the projections 4 are coated with a protective layer. It is thus possible to ensure a minimum value of the coupling backlash and avoid, with even greater reliability, any possible micro-telescoping of the material of the support hub 2 and the material of the braking band 3.

This protective layer can be made for example of powdered graphite or a resin loaded with powdered graphite. In this case, upon manufacture of the hub 2, due to the temperature of the alloy to which the protective layer is put in contact, the protective layer is carbonized and transformed, in turn, to powdered graphite that is easily removed by shaking or by localized jets of compressed gas. It is thus possible to ensure a backlash slightly greater in the coupling of each projection 4 to the corresponding seat 8.

After the cast of the hub has solidified, the opening step of the moulds provides the disc according to the invention.

Those skilled in the art will appreciate that a rotor according to the invention being manufactured in accordance with the described method according to the invention, overcomes the problems complained of in the prior art.

When the rotor 1 according to the invention is being used, despite the high temperature being reached by the braking band 3, the rotor is not subjected to any deformation besides the thermal expansion in its plane. In fact, due to the fact that each projection 4 is enabled to radially slide within its seat 8, the braking band 3 is free to expand in its plane independently from the support hub 2.

The slight backlash allowing the projections 4 to radially slide within the seats 8 can be defined for example during the first operating cycles. The poor surface roughness of the side faces 40 and walls 80 allows the projections 4 to slide along the seats 8 since the very beginning. The first sliding cycles determine the removal of any micro-relief and hence define the coupling backlash.

The embodiment of the rotor 1 providing a substantial parallelism of the opposite side faces 40 of the projections 4 allows one to obtain considerable advantages when the thermal expansion of the braking band 3 is the greatest. In fact, due to the parallelism of the faces 40, to any radial displacement of any projection 4, which is due to the thermal expansion of the braking band 3, there will not follow any increase in the coupling backlash of the projection 4 to the seat 8.

The embodiment of rotor 1 providing a small angle $2\alpha$ between the opposite side faces 40 allows to obtain further advantages whenever the thermal expansion of the projections 4 is non-negligible. In fact, because of the small angle $2\alpha$, the radial displacement of each projection 4 due to the thermal expansion of the braking band 3 enables each projection 4 to dilate, in turn, without any risk of seizing within the seat 8.

The embodiment of the disc 1 providing the chamfer 42 of the sharp edges of faces 40 to those ends radially proximate to the axis x-x allows one to improve the comfort during the cooling step of the rotor 1 at the end of each use session. In fact, due to the chamfer 42, during the slight radial displacement of each projection 4 towards the axis x-x, one obtains a clear noise reduction due to the fact that each projection 4 slides within its seat 8.

A similar effect is also obtained by biasing the faces 40 by a small angle $\alpha$ relative to the radial axis r-r passing through the center of the projection 4.

Particularly, it should be noted that the projections 4, being manufactured as one piece with the braking band 3, are capable of withstanding high tangential loads and thus transmitting a considerable braking torque. Particularly, the presence of the fillets 44 allows an optimum distribution of the stress from the projection to the braking band, and vice versa.

Analogously, the walls 80 of the seats 8, being manufactured as one piece with the support hub 2, are also capable of withstanding high tangential loads and thus transmitting a considerable braking torque.

In accordance with the preferred embodiments of the rotor 1, the total braking torque is distributed over a congruous number of projections 4. The particular embodiment illustrated in the annexed drawings distributes for example the total torque over 12 projections. The number of projections is preferably greater than 6 and still more preferably greater than 10.

The particular geometry of the projections 4 and seats 8 being illustrated in the annexed drawings also allows to distribute the single braking torque quota proper of each projection over a wide contact surface of the side face 40 of projection 4 to the wall 80 of the seat 8. In this way, it is possible to dramatically reduce the stress peaks on the coupling of the side face 40 with the wall 80.

Obviously, those skilled in the art, aiming at satisfying contingent and specific requirements, will be able to carry out a number of modifications and variants to the rotor for a disc brake according to the invention, all being however contemplated within the scope of protection of the invention such as defined in the following claims.

Accordingly, for example the step of surface finishing of the side faces 40 of the projections 4 can be brought to completion by other known methods, such as for example by dipping the workpiece in a vibrating tank containing abrasive elements.

Alternatively, the section of the protrusions 4 can vary from the rectangular one described above, being sufficient to vary also the section of the radial seats in a corresponding manner.

What is claimed is:

1. A rotor for a disc brake, said rotor comprising:
   a hub having a rotation axis, said hub having radially extending quadrangular shaped seats defined by four side walls,
   an annular disc disposed coaxially about the hub,
   a plurality of connecting elements formed integrally with and projecting radially inward from said disc into a respective one of said seats, and said connecting elements being formed integral with said disc at the time of manufacture,
   each of said connecting elements having a quadrangular section defined by four side faces,
   each of said connecting elements having a fillet that reduces the quadrangular section of the connecting elements to distribute stress between the connecting elements and the disc,
   each said seat being perfectly complementary with the four side faces of a respective connecting element and having radial play therewith so that said walls and said side faces absorb thermal expansion and allow each connecting element to move radially within the respective seat, but prevent relative movement in axial and tangential directions between the connecting element and the respective seat,
   the four side walls of each of said seats being made as one piece with the hub such that the connecting elements integral to the disc are secured, in both the axial direction and in the tangential direction, but are free to move in the radial direction with respect to the respective seats,
   surfaces of the side faces and the side walls are intimately coupled yet disjoined from one another, and
   the side faces of the connecting elements have an average surface roughness $R_a$ of less than $6.4 \times 10^{-6}$ meters for reducing micro-telescoping as the connecting elements slide within the respective seat.

2. The rotor according to claim 1, wherein each of said side faces is parallel to an opposite side face.

3. A rotor for a disc brake, the rotor comprising:
   a hub having a rotation axis;
   the hub having a plurality of quadrangular shaped seats of extending radially inward, and each of the plurality of the seats having four inwardly facing side walls being formed integral with the hub;
   an annular disc disposed coaxially about and surrounding the hub;
   the disc having a plurality of connecting elements formed integrally with the disc at the time of manufacture, and each of the plurality of connecting elements having a radially outer section, a radially inner quadrangular section and a fillet located therebetween;
   the radially outer portion being formed integrally with and between two opposed outer surfaces of the disc, the fillet forming a transition between the radially outer portion and the radially inner quadrangular section, the transition of the fillet having a reduce size and facilitating distribution of stress between the connecting element and the disc, the radially inner quadrangular section having a base and four side faces, and the radially inner quadrangular section extending from the fillet into a complementary respective one of the plurality of quadrangular shaped seats of the hub;
   the radially inner quadrangular section and the respective seat having a clearance fit wherein:
   regardless of a working temperature of the disc and the hub, there is always a positive clearance between a leading end of the connecting element and a bottom of the respective seat;
   the respective connecting element is allowed to move radially with respect to the respective seat to absorb thermal expansion;
   the surfaces of the side faces and the side walls are coupled yet disjoined from one another, in both an axial direction and in a tangential direction, so as to prevent relative movement in the axial and the tangential directions;
   the side surfaces of the connecting elements have an average surface roughness $R_a$ of less than $6.4 \times 10^{-6}$ meters in order to facilitate movement and reduction of micro-telescoping as the respective connecting element slides within the respective seat; and
   each of the side faces is inclined at an angle with respect to an opposite side face.

4. The rotor according to claim 1 wherein said angle is from greater than 0° to 6°.

5. The rotor according to claim 3, wherein said side faces comprise a chamfer; and
   a width of the radially inner quadrangular section is greater than a width of the radially outer portion.

6. The rotor of claim 1, wherein there is a clearance between a free radially inner end of each projection and a bottom of the respective seat formed in the hub, said clearance being positive at all working temperatures of the rotor to prevent the projection from bottoming in the respective seat, whereby the braking band dilates in its plane independently from the support hub.

7. The rotor of claim 6, wherein said clearance, at room temperature, is in the range of about 0.2 to 3 mm.

8. A method for manufacturing a rotor for disc brake comprising the steps of:
   manufacturing an annular disc defining a rotation axis, said disc having a plurality of connecting elements formed integrally with and extending radially inward from said disc, said connecting elements being formed integrally with said disc, each of said connecting elements having a radially inner quadrangular section defined by side faces parallel to a radial axis passing through a center of the connecting element, and fillets that reduce the quadrangular section of the connecting elements to distribute stress between the connecting elements and the disc, modifying the faces of the projections to have a surface roughness $R_a$ of less than $6.4 \times 10^{-6}$ meters so as to facilitate radial movement of the connecting elements relative to a respective quadrangular shaped seat and reduce micro-telescoping, placing the disc in a mold for casting a hub with the connecting elements of the disc projecting radially inward into the mold, manufacturing a hub substantially coaxial with said rotation axis, forming a plurality of radially extending quadrangular shaped seats in said hub that are each defined by four walls formed integral with said hub, each of said quadrangular shaped seats receiving a respective one of said connecting elements to prevent said connecting elements from moving in an axial direction and in a tangential direction while permitting said connecting elements to slide in a radial direction to absorb thermal expansion regardless of a working temperature of the disc and the hub, and said radial seats being perfectly complementary to the side faces of the respective connecting elements, and permitting play between the surfaces of the side faces and the walls such that the side faces and the walls are coupled yet disjointed from one another.

9. The method of claim 8, further comprising a step of surface finishing said connecting elements.

10. The method of claim 8, further comprising a step of coating said connecting elements with a surface protective layer.

11. The method of claim 10 wherein said surface protective layer contains graphite.

12. The method of claim 8, further comprising a step of providing a clearance between a free radially inner end of each projection and a bottom of the respective seat formed in the hub, said clearance being sufficiently large to prevent the projection from bottoming in the respective seat, whereby the braking band dilates in its plane independently from the support hub.

13. The method of claim 12, wherein said clearance, at room temperature, is in the range of about 0.2 to 3 mm.

14. The method of claim 12, wherein the braking band material is cast iron, and further comprising steps of:
  machining of the protuberances surfaces in order to manufacture the fillet;
  inserting the preheated braking band as an insert into a casting mold;
  injecting a melt used to make a hub into the casting mold and casting the hub around the protuberances;
  solidifying the melt; and
  releasing the rotor from the mold.

15. The method of claim 14, further comprising a step of machining the braking surfaces and an axle mounting surface of the hub.

* * * * *